(12) United States Patent
Paloheimo et al.

(10) Patent No.: US 6,481,106 B1
(45) Date of Patent: Nov. 19, 2002

(54) SCISSOR ACTION TOOL

(75) Inventors: Markus Paloheimo, Helsinki (FI); Erkki Olavi Linden, Billnäs (FI)

(73) Assignee: Fiskars Consumer Oy Ab, Billnas (FI)

( * ) Notice: Subject to any disclaimer, the term of this patent is extended or adjusted under 35 U.S.C. 154(b) by 0 days.

(21) Appl. No.: 09/753,937

(22) Filed: Jan. 3, 2001

(51) Int. Cl.[7] .......................... B26B 13/00; B26B 13/12
(52) U.S. Cl. ....................................................... 30/199
(58) Field of Search .......................... 30/177, 199, 257, 30/259

(56) References Cited

U.S. PATENT DOCUMENTS

| | | | |
|---|---|---|---|
| 1,373,638 A | * 4/1921 | Roach | 30/257 |
| 2,587,586 A | * 3/1952 | Bernardi | 30/257 |
| 3,007,245 A | 11/1961 | Keiser | 30/248 |
| 5,159,757 A | 11/1992 | Weid et al. | 30/251 |
| 5,592,743 A | 1/1997 | Labarre et al. | 30/271 |

OTHER PUBLICATIONS

European Search report related to Application No. EP 0100641.

* cited by examiner

*Primary Examiner*—Douglas D. Watts
(74) *Attorney, Agent, or Firm*—Foley & Lardner

(57) ABSTRACT

The present invention relates to scissor action tools which comprise first and second cutting elements pivotable about a first joint in a first plane of movement and first and second hand levers pivotable about a second joint in a second plane of movement. One end of the first cutting element is pivotally connected to one end of the first hand lever at a third joint and one end of the second cutting element is pivotally connected to one end of the second hand lever at a fourth joint, a line connecting the third and fourth joint forming a meeting line between the first and second plane of movement. The third and fourth joint allow the angle between the first and second plane of movement to be adjusted.

8 Claims, 3 Drawing Sheets

SCISSOR ACTION TOOL

FIELD OF THE INVENTION

This invention relates to a scissor action tool and more particularly to garden shears or the like which are especially suitable for cutting grass but can also cut thin branches and hedges, and are provided with a pair of cooperatively engaging cutting elements united for scissor action about a joint.

BACKGROUND OF THE INVENTION

The nearest prior art for the present invention is represented by long-arm tools with scissor-type function, used primarily for cutting grass and straws at the level of the ground surface, the user being in a standing position. It is to be noted, for the sake of clarity, that such grass cutters are used, above all, in finishing cuttings around trees, stones or the like objects.

In practice, these kinds of tools comprise a pair of blades which are pivoted to move relative to each other in a scissor-like manner relative to one pivotal point. The hand levers of the scissors have long arms to such an extent that the user can cut grass without having to bend down. Further, handle bars are typically positioned at the end of the arms in a horizontal position. To enable cutting with the tool in the first place, the pivotal point between the blades must be in a horizontal direction sufficiently far from the hand levers. This distance is the lever arm by means of which the blades can be subjected to shear force. In practice, the arms will thus be located for example at an angle of 45 degrees relative to the horizontal plane, the actual blades and correspondingly the handle bars being in a substantially horizontal plane.

This geometry causes two problems. Firstly, the bolt forming the pivotal point in practice is subjected to adverse and, as regards the cutting, unnecessary torque, which is brought about by the force moving the handle bars towards each other multiplied by the vertical distance between the pivotal point and the hand levers. In order for the structure to be able to bear this torque, it must be made unduly heavy. Secondly, the structure brings about torque in the handle bars, due to the center of mass of the cutters being clearly on the front side of the handle bars, in practice often relatively close to the pivotal point of the blades. Resisting this torque causes static tension in the user's wrists, which easily makes it heavy and unpleasant to use a tool of this kind.

SUMMARY OF THE INVENTION

It is an object of the present invention to provide a scissor action tool as described above, particularly long-arm multi-purpose garden scissors which do not have the above problems relating to the conventional design. This object is achieved by providing a scissor action tool, comprising first and second cutting elements pivotable about a first joint in a first plane of movement, first and second hand levers pivotable about a second joint in a second plane of movement, one end of said first cutting element being pivotally connected to one end of said first hand lever at a third joint and one end of said second cutting element being pivotally connected to one end of said second hand lever at a fourth joint, a line connecting said third and fourth joint forming a meeting line between said first and second plane of movement and said third and fourth joint allowing the angle between said first and second plane of movement to be adjusted.

The structure utilized in the tool according to the invention allows adjustment of the angle between the arms and the blades, whereby, for example, an angle of 90 degrees may be used when grass is cut, in which case torque straining the user's hands is not generated at all, because the center of mass is directly downwards from the user's hands. The above-mentioned property of the tool according to the invention is facilitated by the fact that said first and second hand levers comprise at one end handle bars extending at an approximately right angle from the hand levers.

A preferred way to implement a pivotal point in which the blades and arms are joined to each other is to implement the structure in such a way that said third and fourth joint each comprises a cylindrical seat attached to said one end of one of said hand levers and having an axis parallel to said second plane of movement, a first insert received by said seat, having a cylindrical contour co-operating with the inner surface of said seat and an end surface facing outwards from said seat, and provided with a cylindrical boring going through said first insert transverse to the axis of said cylindrical contour of said first insert and opening to said end surface of said first insert, a second insert received by said cylindrical boring of said first insert, having a cylindrical contour co-operating with the inner surface of said boring, and provided with a longitudinal slot for receiving said one end of one of said cutting elements, said end being provided with a hole, and with a transverse hole for receiving a pin extending through said hole in said cutting element to lock said cutting element pivotably in said slot.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
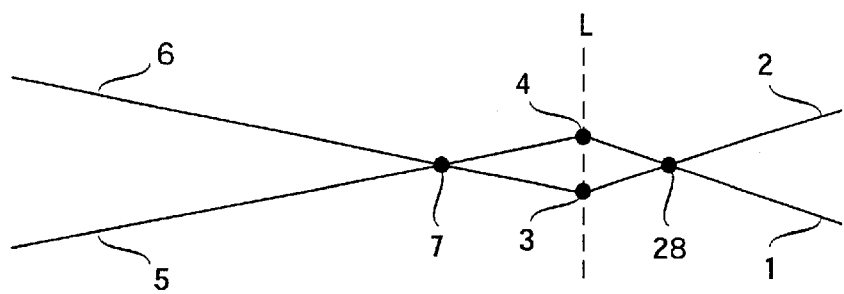
FIG. 1 shows schematically the operating principle of the tool of the invention.

FIG. 1 illustrates the principle structure of a tool according to the invention with the intention to illustrate its pivotal structure in particular. The tool comprises operating arms 5 and 6, which are pivoted to move relative to each other in a scissor-like manner relative to the pivotal point 7. The arms 5 and 6 are at one end pivoted to blade elements 1 and 2 at pivotal points 3 and 4. Those sections of the operating arms 5 and 6 on the side of the user at the pivotal point 7 at the ends of which the operating hand levers (not shown in FIG. 1) will be located, are substantially longer than those sections of the arms at the ends of which the arms are joined to the blade elements 1 and 2. In this way, the lever arms operating the blades can be made long compared with the distance between the joint 7 and the pivotal points 3 and 4, whereby a good shear force is achieved. The blade elements 1 and 2 are pivoted in a scissor-like manner to each other by the pivotal point 28.

As shown in FIG. 1, the operating arms 5 and 6 move in one plane around the pivotal point 7, and the blade elements 1 and 2 move in another plane around the pivotal point 28. According to the basic idea of the invention, the joints 3 and 4 allow the angle between these two planes to be adjusted in almost any position around the imaginary axis L between the pivotal points 3 and 4. The angle is only limited by practical aspects, which prevent the blade elements to be adjusted totally in the direction of the arms 5 and 6 in both extreme positions. In what is regarded as the most preferred embodiment of the invention, the joints 3 and 4 are made in such way eccentric that, as will be described in more detail in connection with FIGS. 2 to 4, the blade elements can be turned in one extreme position against the arms 5 and 6 to achieve a practical storing position.

Figure 2:
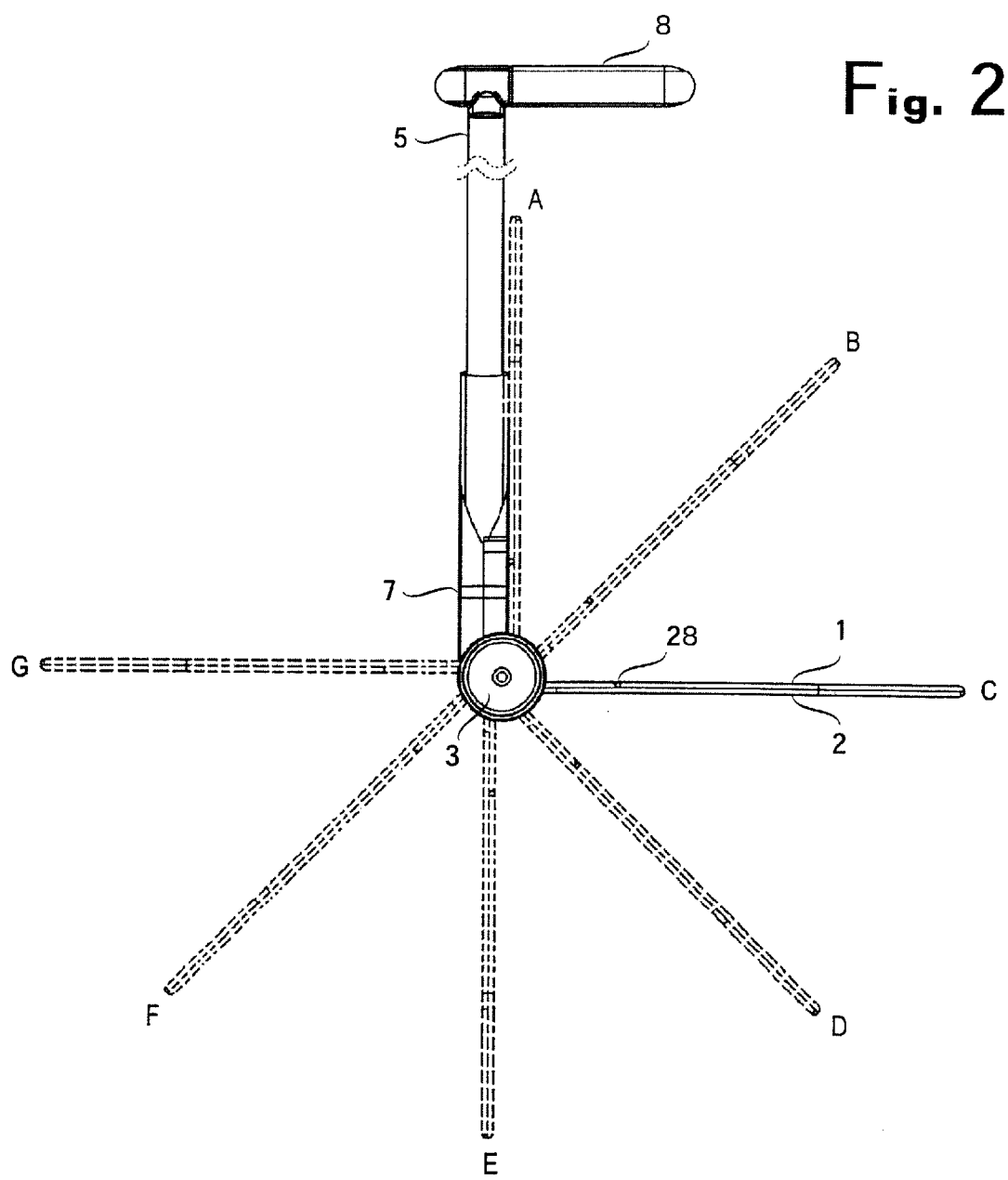
FIG. 2 shows a preferred embodiment of the scissor action tool according to the invention in a sideview showing some of the positions in which the cutting elements can be adjusted.

Adjustment positions of the angle between the arms 5 and 6 and the blade elements 1 and 2 and consequent details will now be described in greater detail with reference to FIG. 2. FIG. 2 shows an exemplary embodiment of the tool according to the invention seen as a side view in such a way that the different position options are indicated. The scissors illustrated in FIG. 2 comprise first and second cutting elements, i.e. scissor-like blades 1 and 2, which are pivoted to turn around the pivotal point 28 in a scissor-like manner relative to each other. These blade elements are joined at one end to the pivotal point 3 and correspondingly 4, which connect the blades to the operating arms 5 and correspondingly 6. The operating arms are also pivoted at one pivotal point 7 to be pivotally connected to each other. The handle bars 8 and 9 are connected to the ends facing away from the blades 1 and 2 of the operating arms. These handle bars 8 and 9 protrude from the operating arms 5 and 6 in a substantially perpendicular direction.

The usual position of the blades 1 and 2 relative to the operating arms 5 and 6 is position C indicated by an unbroken line in FIG. 2, in which position the blades protrude in a substantially perpendicular direction from the operating arms 5 and 6. Hereby, the handle bars 8 and 9 protrude from the arms 5 and 6 to the same side and in the same direction as the cutting elements 1 and 2. Thus, when the tool is supported by handle bars 8 and 9 in such a way that they point away from the user, i.e. the user also naturally stands facing away from the blades 1 and 2, the center of mass of the tool is located directly below the handle bars 8. In this way, the hands supporting the tool are not subjected to torque due to the weight of the tool.

In FIG. 2, different positions of the blade elements 1 and 2 are indicated by letters A . . . G. As became clear from the above, the usual operating position is position C. In this position, as described above, it is possible to cut grass and straws at the level of the ground surface or close to it also in a position close to the ground surface without the joints 3 and 4 hindering it. As becomes obvious from FIG. 2, the blades are connected to the pivotal points 3 and 4 eccentrically in such a way that in position C they are closer to the ground surface than in position G, in which they point to the opposite direction. Said position G is therefore most suitably used when the intention is to cut grass, straws or the like somewhat higher relative to the ground surface. It is to be noted that in this case the user naturally stands on the side of the hand levers 8 of the tool so as not to injure his/her legs.

Position A of the blades, in which the blades point in the direction of the arms 5 and 6 on the side of the hand levers is most suitable in the storage of the tool. Position B or the positions close to it between positions A and C are applicable for instance when the ground surface in front of the user rises more or less steeply upwards, whereby the blades can be positioned in accordance with the corresponding angle of inclination. Position D, which points to some extent downwards and in which the angle between the arms 5 and 6 and the blades 1 and 2 is about 120°, is correspondingly relevant when the ground in front of the user slopes downwards, such as at the edge of a ditch. Position E, in which the blades form an extension to the arms 5 and 6, is applicable for example when it is desirable to cut objects that are relatively far away, such as thin branches of bushes or trees. Position F, in which the angle between the arms and the blades is about 210° could be relevant for example when it is desirable to trim tops of a relatively high hedge, whereby the tool is directed slightly diagonally upwards, it being still desirable for the blades to be located in a horizontal position.

The positions A to G are shown only for illustrative reasons, and in practice the blades can be adjusted and locked in any desirable position.

As became obvious from the above, the possibility to adjust the plane of movement of the blades at different angles relative to the plane of movement of the hand levers allows a wide variety of objects of use for the tool. This construction also avoids those problems according to the prior art that are related to torque being directed at the user's hands, or to part of the force being directed at the pivotal point between the blades, turning it. In the solution according to the invention, the force is conveyed directly to the pivotal points 3 and 4 through the pivotal point 7, from where it is conveyed to the blades 1 and 2 without there being any torque that would be directed at some pivotal point in a plane other than its normal plane of movement.

Figure 3:
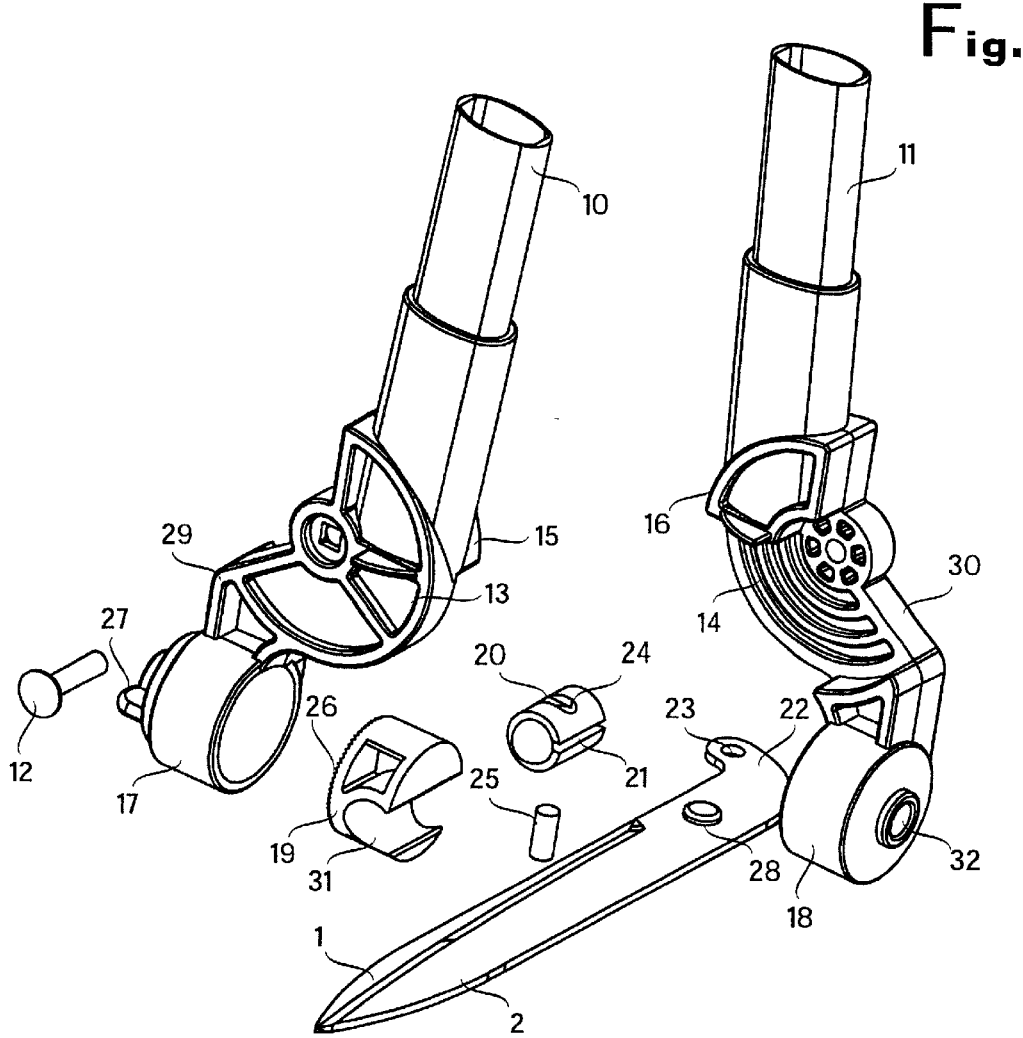
FIG. 3 shows the joints of the tool of FIG. 2 in a disassembled state.
Figure 4:
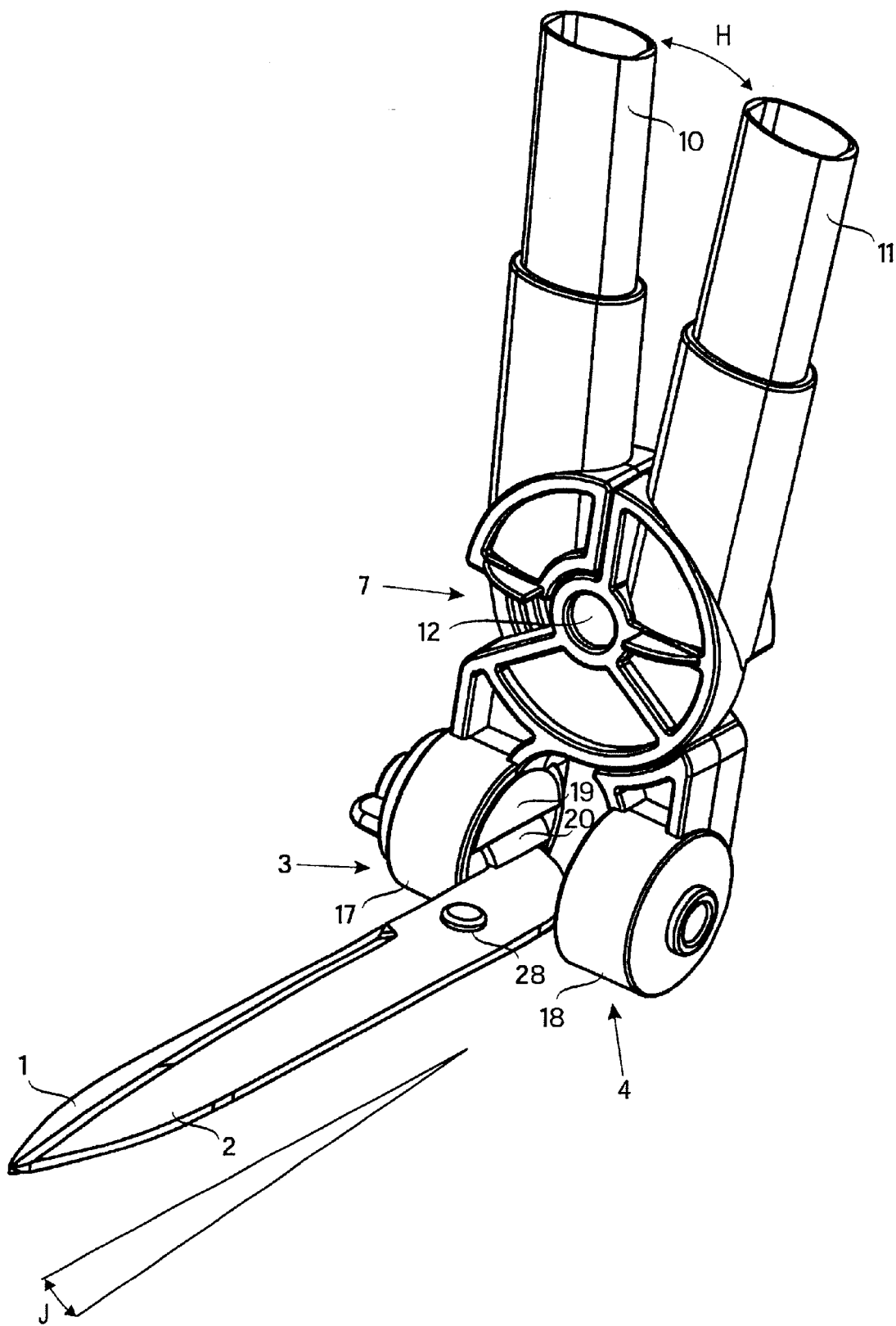
FIG. 4 shows the joints of the tool according to FIG. 1 in an assembled state.

FIGS. 3 and 4 illustrate in more detail the structure of the kind of tool shown in FIG. 2, as regards the blades and the pivotal points close to them. The arms 5 and 6 and the handle bars 8 and 9 connected thereto are not shown in FIGS. 3 and 4. Also in practice, the tool is most preferably assembled in such a way that the operating arms 5 and 6 are tubular and they are pushed onto sleeves 10 and 11 shown in FIGS. 3 and 4. The sleeves 10 and 11, which in other words are received by the operating arms 5 and 6, are pivoted to each other at the pivotal point 7 with a journal 12. The pivotal point 7 is formed of planar pieces 13 and 14 connected to the sleeves 10 and 11 and covering a sector of about 230° of a circle, the pieces being arranged upon each other and connected to each other by means of the journal 12 inserted through the holes at the center thereof. In order to limit the turning of the pivotal point, both pieces 13 and 14 are provided with sections 15 and 16 protruding from the plane of the pieces 13 and 14 and covering a sector of about 80°, which, when the planar pieces 13 and 14 are turned around the pivotal point relative to each other, limit the rotational angle of the joint. This kind of secure limitation of the rotational angle is necessary so that accurate extreme points are achieved for the movement of the blades 1 and 2.

Cylindrical seats 17 and 18 are placed at a relatively short distance away from the planar pieces 13 and 14 by arms 29 and 30, the center axes of which seats are located in the plane of movement of the operating arms 5 and 6 and which form part of those joints 3 and 4 via which the plane of movement of the operating arms 5 and 6 and the plane of movement of the blades 1 and 2 are pivoted to each other. The structure of these joints 3 and 4 is shown in greater detail in FIG. 3, in particular. The figure indicates that at first, an insert 19 having a cylindrical contour is taken into the inside of the cylindrical seat 17, which insert has a cylindrical boring 31 in a perpendicular direction relative to its cylinder axis, into which, in turn, a second cylindrical insert 20 is positioned. The boring for this cylindrical insert 20 has been made in the insert 19 in such a way that part of this boring opens to the end surface of the insert 20, which faces outwards from the cylindrical seat 17. Thus, the insert 20 having been taken into the insert 19, part of it can be seen through the end surface of the insert 19. A slot 21 has been made for this visible part of the insert 20, the slot being arranged to receive the end of a blade facing outwards from the sharpened section of the blade, in FIG. 3 the end 22 of the blade 2. The insert 20 is also provided with a hole 24 transverse relative to the slot 21.

The structure is assembled in such a way that the end 22 of the blade 2 is taken into the inside of the slot 21 of the insert 20 and locked there by taking a pin 25 through the insert 24, whereby it also goes through the hole 23 in the blade. In practice, the pin 25 has to be tight relative to the insert 20 and loose relative to the blade 23, whereby the blade can turn relative to the pin 25. After this, the insert 20 is taken into the cylindrical boring 31 of the insert 19, the insert 19 being positioned in the cylindrical seat 17 and locked there by means of a locking nut 27 and a screw (not shown) taken through the bottom of the seat 17. When the locking nut is loosened, the insert 19 can be turned relative to the seat 17 and in this way adjust the position of the blades relative to the operating arms. By tightening the locking nut the blades can be locked in a desired position. The end surfaces of the seat 17 and the insert 19 positioned against each other can be provided with cogging 26, which ensures that the blades are locked in a desired angle position without a need to turn the locking nut unreasonably tight.

The cylindrical seat 18 and the pivotal point formed thereby are identical with the pivotal point formed by the seat 17, but the pivotal point formed by the seat 18 does not comprise a locking nut but only a spring biased screw 32 driven through the bottom of the seat and retaining the insert 19 inside the seat 18. The screw 32 is tightened in such a degree that the spring biasing allows the insert 19 to turn inside the seat 19.

The parts shown above in FIG. 3 are illustrated assembled in FIG. 4. On the basis of FIG. 4, it can be noted that the insert 19 can turn inside the cylindrical seat 17 and correspondingly 18, enabling changing of the plane of movement of the blades 1 and 2, indicated by arrow J in FIG. 4, relative to the plane of movement of the sleeves 10 and 11 and the operating arms connected thereto, indicated by arrow H in FIG. 4. The insert 20, in turn, allows the angle of the blades 1 and 2 to be changed relative to the cylindrical seats 17 and 18 when the seats 17 and 18 go apart from or come towards each other, i.e. when the sleeves 10 and 11 are made go apart or come towards each other. In this way, a situation is avoided where the mechanism would direct torsion at the journal 28 pivoting the blades 1 and 2 to each other.

Above, the scissor action tool according to the invention has only been described referring to one exemplary embodiment, and it is to be understood that a plurality of structural modifications may be made thereto without substantially diverging from the scope defined in the attached claims.

What is claimed is:

1. A scissor action tool, comprising first and second cutting elements pivotable about a first joint in a first plane of movement, first and second hand levers pivotable about a second joint in a second plane of movement, one end of said first cutting element being pivotally connected to one end of said first hand lever at a third joint and one end of said second cutting element being pivotally connected to one end of said second hand lever at a fourth joint, a line connecting said third and fourth joint forming a meeting line between said first and second plane of movement and said third and fourth joint allowing the angle between said first and second plane of movement to be adjusted, wherein said first and second hand levers at their opposite ends comprise handles extending in a third plane.

2. The scissor action tool of claim 1, wherein said first and second hand lever at their other ends comprise handle bars extending about at right angle from the hand levers.

3. The scissor action tool of claim 1, wherein said third and fourth joint each comprises
   a cylindrical seat attached to said one end of one of said hand levers and having an axis parallel to said second plane of movement,
   a first insert received by said seat, having a cylindrical contour cooperating with the inner surface of said seat and an end surface facing outwards from said seat, and provided with a cylindrical boring going through said first insert transverse to the axis of said cylindrical contour of said first insert and opening to said end surface of said first insert,
   a second insert received by said cylindrical boring of said first insert, having a cylindrical contour co-operating with the inner surface of said boring, and provided with a longitudinal slot for receiving said one end of one of said cutting elements, said end being provided with a hole, and with a transverse hole for receiving a pin extending through said hole in said cutting element to lock said cutting element pivotably in said slot.

4. A scissor action tool, comprising first and second cutting elements pivotable about a first joint in a first plane of movement, first and second hand levers pivotable about a second joint in a second plane of movement, one end of said first cutting element being pivotally connected to one end of said first hand lever at a third joint and one end of said second cutting element being pivotally connected to one end of said second hand lever at a fourth joint, a line connecting said third and fourth joint forming a meeting line between said first and second plane of movement and said third and fourth joint allowing the angle between said first and second plane of movement to be adjusted, wherein said third and fourth joint each comprises a cylindrical seat attached to said one end of one of said hand levers and having an axis parallel to said second plane of movement, a first insert received by said seat, having a cylindrical contour co-operating with the inner surface of said seat and an end surface facing outwards from said seat, and provided with a cylindrical boring going through said first insert transverse to the axis of said cylindrical contour of said first insert and opening to said end surface of said first insert, a second insert received by said cylindrical boring of said first insert, having a cylindrical contour co-operating with the inner surface of said boring, and provided with a longitudinal slot for receiving said one end of one of said cutting elements, said end being provided with a hole, and with a transverse hole for receiving a pin extending through said hole in said cutting element to lock said cutting element pivotably in said slot.

5. The scissor action tool of claim 4, wherein said first and second hand levers at their opposite ends comprise handle bars extending about at right angles from the hand levers.

6. A scissor action tool, comprising first and second cutting elements pivotable about a first joint in a first plane of movement, first and second hand levers pivotable about a second joint in a second plane of movement, one end of said first cutting element being pivotally connected to one end of said first hand lever at a third joint and one end of said second cutting element being pivotally connected to one end of said second hand lever at a fourth joint, the third joint and the fourth joint positioned eccentrically from said first hand lever and said second hand lever, and said first cutting blade and said second cutting blade selectively movable to a storage position adjacent to the first hand lever and the second hand lever.

7. The scissor action tool of claim 6, wherein said first and second hand levers at their opposite ends comprise handle bars extending in a third plane.

8. The scissor action tool of claim 6, wherein said third and fourth joint each comprises a cylindrical seat attached to said one end of one of said hand levers and having an axis parallel to said second plane of movement, a first insert received by said seat, having a cylindrical contour co-operating with the inner surface of said seat and an end surface facing outwards from said seat, and provided with a cylindrical boring going through said first insert transverse to the axis of said cylindrical contour of said first insert and opening to said end surface of said first insert, a second insert received by said cylindrical boring of said first insert, having a cylindrical contour co-operating with the inner surface of said boring, and provided with a longitudinal slot for receiving said one end of one of said cutting elements, said end being provided with a hole, and with a transverse hole for receiving a pin extending through said hole in said cutting element to lock said cutting element pivotably in said slot.

* * * * *